United States Patent [19]

Mattelmäki

[11] Patent Number: 5,110,567
[45] Date of Patent: May 5, 1992

[54] METHOD AND APPARATUS FOR HEAT TREATMENT OF LIME MUD

[75] Inventor: Esko I. Mattelmäki, Varkaus, Finland

[73] Assignee: A. Ahlstrom Corporation, Noormarkku, Finland

[21] Appl. No.: 467,398

[22] Filed: Jan. 22, 1990

[30] Foreign Application Priority Data

Jan. 26, 1989 [FI] Finland .................... 890376

[51] Int. Cl.$^5$ .................................. C01F 11/06
[52] U.S. Cl. .......................... 423/175; 422/232; 423/637; 432/106
[58] Field of Search ............ 423/175, 177, 637

[56] References Cited

U.S. PATENT DOCUMENTS

| | | |
|---|---|---|
| 2,503,788 | 4/1950 | White . |
| 2,650,084 | 8/1953 | White . |
| 2,774,661 | 12/1956 | White . |
| 3,664,650 | 5/1972 | Weber et al. ........................ 263/32 |
| 3,796,791 | 3/1974 | Nielsen et al. ..................... 423/175 |
| 4,098,871 | 7/1978 | Schoppe .............................. 423/177 |
| 4,321,239 | 3/1982 | Bildjukevich et al. ............ 423/175 |

FOREIGN PATENT DOCUMENTS 25260 3/1952 Finland .

OTHER PUBLICATIONS

John H. Perry, *Chemical Engineers' Handbook*, Fourth Edition (1963), McGraw-Hill Book Co., pp. 20-54 through 20-57.

*Primary Examiner*—Wayne A. Langel
*Attorney, Agent, or Firm*—Nixon & Vanderhye

[57] ABSTRACT

In the heat treatment of lime mud, the lime mud to be introduced to a lime reburning kiln is dried in a pneumatic drier by flue gases from the lime reburning kiln in order to regenerate the lime contained in the mud. Prior to drying, the lime mud is thickened in a drying filter to a dry solids content of over 75%, preferably to approximately 80%. In this way, the lime reburning kiln can be made approximately 30% shorter than conventional kilns, and the apparatus is simpler than the conventional apparatus provided with a pneumatic drier.

12 Claims, 1 Drawing Sheet

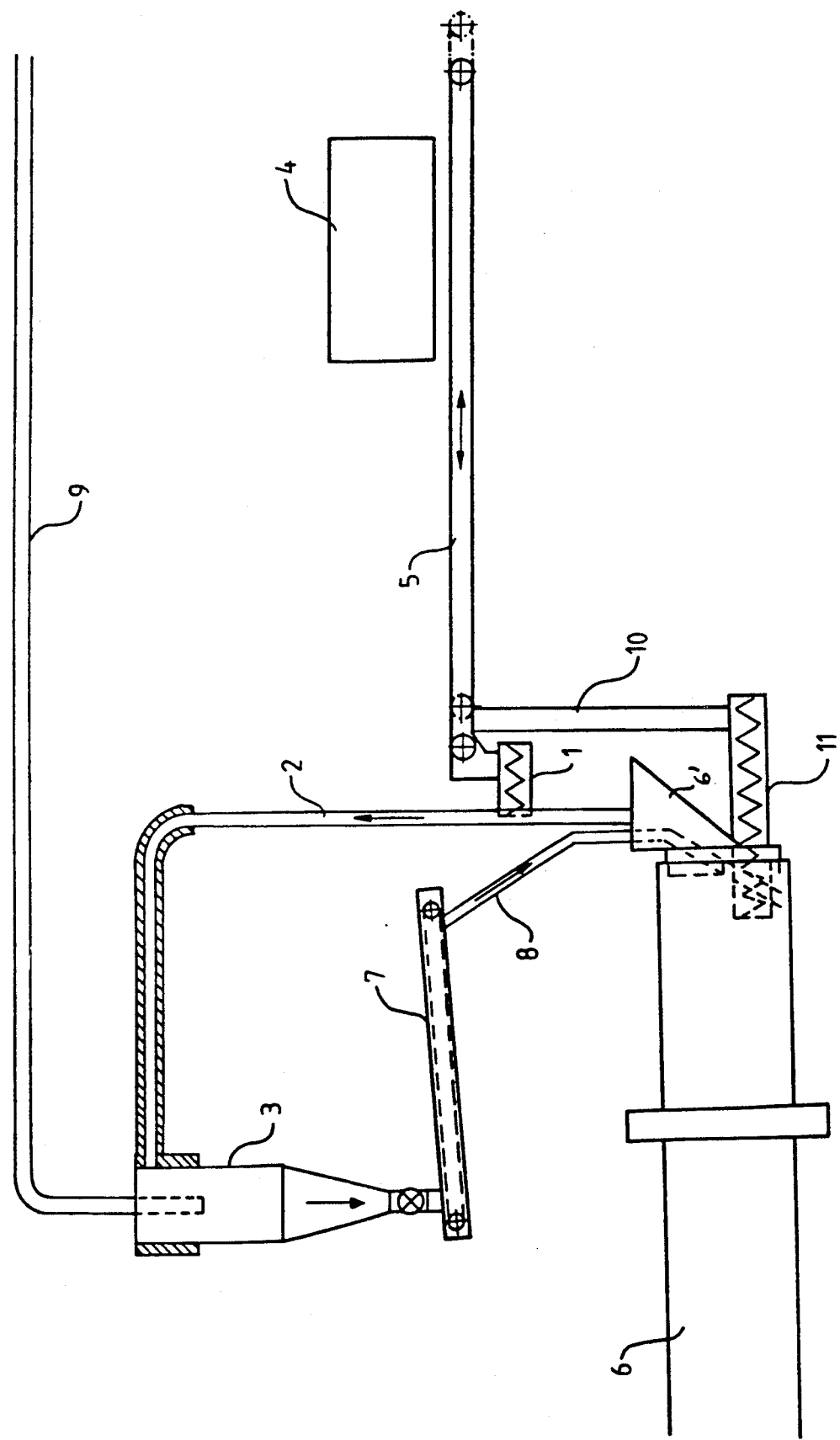

METHOD AND APPARATUS FOR HEAT TREATMENT OF LIME MUD

BACKGROUND AND SUMMARY OF THE INVENTION

The present invention relates to a method and apparatus for treating lime mud in order to regenerate the lime mud, which has been separated in connection with causticizing process and is mainly $CaCO_3$, to form $CaO$ in a rotary kiln.

By prior art methods, lime mud is introduced at a dry solids content of 60 through 70% in the top end of a rotary kiln wherefrom it slowly glides downward through drying, heating and reaction zones. The drying zone, in which heat is transferred from flue gases to the lime mud mainly through convection, also includes chains employed to improve the heat transfer. The chains contact the lime mud when the kiln rotates. In order to obtain good results, the heat treatment of the lime mud in the kiln must take place slowly, requiring utilization of a long kiln, and taking up a large space.

It has been possible to shorten a lime reburning kiln by carrying out the drying and the preheating of lime mud in pneumatic driers with flue gas prior to introducing the lime mud in a lime reburning kiln.

As the wet lime mud obtained from the filter is difficult to handle, dried lime mud has been mixed into it before it has been fed to a pneumatic drier. The equipment needed for the pretreatment of lime mud has been complex and it has required a complicated control and adjustment system.

The object of the invention is to provide a simple method and an apparatus for drying and preheating lime mud.

The invention is based on the observation that if lime mud is thickened in a lime mud filter to a dry content of over 75%, the lime mud can be introduced directly to a pneumatic drier and no hammer mills or mixer screws are needed to disrupt the lumps. The lime mud is then so dry that the drier will remain open.

The method of the invention is mainly characterized in that the lime mud is thickened in a lime mud filter to a dry solids content of over about 75%, the lime mud from the filter is dried and preheated in a pneumatic drier by means of flue gas from a lime reburning kiln, and the dried lime mud is separated from the flue gases and introduced in the lime reburning kiln.

The apparatus of the invention is characterized in that it comprises a drying conduit for guiding flue gas from the lime reburning kiln to a cyclone, a feed screw for dosing the lime mud from the lime mud filter to the vertical portion of the drying conduit and means for transferring the dried lime mud separated in the cyclone to the lime reburning kiln.

The method and the apparatus of the invention provides at least the following advantages over conventional lime reburning kilns: The lime reburning kiln is approximately 30% shorter than conventional kilns, which dispense with at least one support. The investment in the kiln is smaller. Space is saved (which is important in many cases). The end temperature of the flue gases decreases, which reduces the oil consumption of the lime reburning kiln. The heat transfer in the drying conduit and in the cyclone is much more efficient than in the conventional chain zones; and the chain zone and the lifting zone can be shorter than in conventional kilns.

Compared with the prior art lime reburning kilns provided with pneumatic driers, the apparatus of the present invention is less expensive and simpler and consumes remarkably less energy.

BRIEF DESCRIPTION OF THE DRAWINGS

The invention is described closer below with reference to the accompanying drawing which is a schematic of an exemplary apparatus used for carrying out the method of the invention.

DETAILED DESCRIPTION OF THE DRAWINGS

The drawing FIGURE schematically illustrates the principle of a drier operating according to the method of the present invention. The main parts of the apparatus illustrated in the drawing are a feed screw 1, a drying conduit 2, and a separation cyclone 3. Lime mud is thickened in a lime filter 4. There is a conveyor belt 5 under the filter which conveyor drops the lime mud coming from the filter to the feed screw 1. The lower end of the drying conduit 2 is connected to the upper end 6' of a lime reburning kiln 6 from which end the flue gases exit from the kiln. The lime reburning kiln is rotated by a driving mechanism by a method known per se. The upper end of the drying conduit 2 is tangentially connected to the upper end of the cyclone 3.

The feed screw 1 is connected to the drying conduit 2 and it doses the lime mud discharged from the filter 4 to the vertical portion of the conduit 2.

The lime mud is conveyed in the drying conduit with the flue gases from 6' to the cyclone 3 and is at the same time dried and heated by the heat of the flue gases. The lime mud separated in the cyclone is discharged from the lower end of the cyclone and a conveyor belt 7 disposed under the cyclone conveys the dried lime mud to a feed conduit 8 leading to the upper end of the kiln 6. Flue gases are removed from the cyclone via a conduit 9.

There is also another feed point for lime mud in the kiln 6. When the "precoat" of a lime filter 4 is replaced (e.g. during maintenance operations) it is not desirable to feed the wet lime mud lump to the pneumatic drier as there is the danger of clogging. Under these circumstances, the conveyor belt 5 is pulled back so as to drop the lime mud into a conduit 10 under the conveyor, from which it is fed by a screw 11 to the lime reburning kiln 6.

The lime mud is prefereably fed at a dry solids content of approximately 80%, to the drying conduit 2 where it dries further to a dry solids content of approximately 100%.

The invention is not limited by the embodiment disclosed here as an example but its details may vary within the scope of protection defined by the appended patent claims.

What is claimed is:

1. A method for heat treating lime mud utilizing a pneumatic drier and a reburning kiln, comprising the steps of:
    (a) thickening lime mud to a dry solids content of over about 75%;
    (b) drying and preheating the thickened lime mud in the pneumatic drier utilizing flue gases exhausted from the kiln;

(c) separating the thickened, dried, lime mud from the flue gases; and (d) feeding the thickened, dried, lime mud to the kiln.

2. A method as recited in claim 1 wherein step (a) is practiced to thicken the lime mud to a dry solids content of about 80%.

3. A method as recited in claim 2 wherein step (b) is practiced so that the dry solids content of the lime mud is about 100%.

4. A method as recited in claim 3 wherein step (a) is practiced by acting on the lime mud with a lime filter.

5. A method as recited in claim 4 wherein step (c) is practiced by passing the lime mud to a cyclone separator.

6. A method as recited in claim 5 comprising the further step, during startup after maintenance of the lime filter, of (e) passing the initial portion of the lime mud directly to the kiln, so that it does not pass through the pneumatic drier.

7. A method as recited in claim 6 wherein the lime mud is normally discharged from the lime filter onto a conveyor which leads to the pneumatic drier; and wherein step (e) is practiced by moving the conveyor so that instead of discharging into the drier, it discharges into the kiln.

8. A method as recited in claim 1 wherein step (b) is practiced so that the dry solids content of the lime mud is about 100%.

9. A method as recited in claim 1 wherein step (a) is practiced by acting on the lime mud with a lime filter.

10. A method as recited in claim 1 wherein step (c) is practiced by passing the lime mud to a cyclone separator.

11. A method as recited in claim 9 comprising the further step, during startup after maintenance of the lime filter, of (e) passing the initial portion of the lime mud directly to the kiln, so that it does not pass through the pneumatic drier.

12. A method as recited in claim 11 wherein the lime mud is normally discharged from the lime filter onto a conveyor which leads to the pneumatic drier; and wherein step (e) is practiced by moving conveyor so that instead of discharging into the drier, it discharges into the kiln.

* * * * *